US011896001B2

(12) United States Patent
Springer, III (10) Patent No.: US 11,896,001 B2
(45) Date of Patent: Feb. 13, 2024

(54) AUTOMATIC WIRELESS DECOY JERK STRING SYSTEM (71) Applicant: MVENT, LLC, Raleigh, NC (US)

(72) Inventor: Curtis Howe Springer, III, Raleigh, NC (US)

(73) Assignee: MVENT, LLC, Raleigh, NC (US)

(*) Notice: Subject to any disclaimer, the term of this patent is extended or adjusted under 35 U.S.C. 154(b) by 139 days.

(21) Appl. No.: 17/701,909

(22) Filed: Mar. 23, 2022

(65) Prior Publication Data
US 2022/0304297 A1 Sep. 29, 2022

Related U.S. Application Data (60) Provisional application No. 63/164,850, filed on Mar. 23, 2021.

(51) Int. Cl.
A01M 31/06 (2006.01)
B65H 75/44 (2006.01)

(52) U.S. Cl.
CPC ......... *A01M 31/06* (2013.01); *B65H 75/4484* (2013.01); *B65H 2701/35* (2013.01)

(58) Field of Classification Search
CPC .............. A01M 31/06; B65H 75/4484; B65H 2701/35
See application file for complete search history.

(56) References Cited

U.S. PATENT DOCUMENTS

| | | | | |
|---|---|---|---|---|
| 2,678,778 A | * | 5/1954 | Gibson | A01M 31/06 242/405.1 |
| 4,660,317 A | * | 4/1987 | Evans | A01K 91/065 43/26.1 |
| 5,111,609 A | * | 5/1992 | Flo | A01K 91/065 43/26.1 |
| 9,629,356 B1 | | 4/2017 | Frierson, II | |
| 9,771,742 B1 | * | 9/2017 | Reed | B65H 75/4486 |
| 10,194,652 B1 | * | 2/2019 | Bloomquist | G10L 25/51 |
| 10,609,920 B2 | | 4/2020 | Smith et al. | |
| 2006/0207158 A1 | * | 9/2006 | Brewer | A01M 31/06 43/3 |

(Continued)

OTHER PUBLICATIONS

"Duck Thang Set Up." Duck Thang. https://duckthang.com/setup/.
(Continued)

*Primary Examiner* — Monica L Perry
*Assistant Examiner* — Brittany A Lowery
(74) *Attorney, Agent, or Firm* — NK Patent Law (57) ABSTRACT An automatic wireless decoy jerk string system is disclosed. The system includes a main housing, a drive housing, and a flotation housing. The main housing contains a retractable reel wound with a line. The drive housing contains a direct current motor, a battery for powering the motor, and a wireless receiver. The flotation housing contains a counterweight and flotation material. The drive housing and the flotation housing are attached to either side of the main housing. A drive shaft runs from the drive housing through the main housing and into the flotation housing. The motor engages the drive shaft to operate the reel. The motor is controlled by signals from the receiver in response to a wireless signal received by the receiver from a remote control to cause the reel to alternatingly retract the line and let out the line.

16 Claims, 3 Drawing Sheets (56) References Cited

U.S. PATENT DOCUMENTS

2017/0295775 A1* 10/2017 Smith ................ B65H 75/4486

OTHER PUBLICATIONS

"Duxtrac System." Duxtrac. 2013. https://www.duxtrac.com/product-page/dunker-duck-and-float-system.
"Motion Decoy System/ DuxTrac—First Look." Duxtrac. https://www.duxtrac.com/videos.
"The Duck Moss Geaux Dux Motion Decoy System." Mackspw. https://www.mackspw.com/Duck-Moss-Geaux-Dux-Motion-Decoy-System.

* cited by examiner

AUTOMATIC WIRELESS DECOY JERK STRING SYSTEM

CROSS-REFERENCE TO RELATED APPLICATIONS

The present application claims the benefit of priority to U.S. Provisional Patent Application No. 63/164,850, titled "Automatic Wireless Decoy Jerk String System," filed on Mar. 23, 2021, which is hereby incorporated by reference in its entirety.

TECHNICAL FIELD

The present invention relates to jerk string systems for moving decoys attached to a jerk string, such as for use in waterfowl hunting, and more specifically to an automatic wireless decoy jerk string system.

BACKGROUND

Hunters often hunt waterfowl from a hunting blind. Part of a waterfowl hunting setup includes decoy animals positioned on a body of water near the blind to draw real animals close to the blind so they can be taken. The decoys are designed to look and act like real waterfowl swimming on the water. One way of causing the decoys to move is to use a jerk string (also referred to as a jerk rig). The jerk string causes the decoys to move on the water in ways that mimic real movements.

Waterfowl hunting often occurs in cold, wet conditions, in inclement weather, and in brackish or salt water. Setup of the decoys often occurs in the dark, before sunrise. During hunting, it is desirable for management of the decoys to be as simple as possible, since the hunter is simultaneously handling a firearm, calling waterfowl, and watching for waterfowl approaching from all directions, all while trying to remain as motionless as possible.

Current jerk string systems, including motorized jerk string systems, have not addressed all the problems associated with deploying and using a jerk string system. For example, current jerk string systems are often heavy, bulky, complicated to maintain and operate (e.g., come in many parts that require assembly in the field), difficult to carry, and difficult to deploy. Additionally, current jerk string systems can be cumbersome and slow to deploy and take-down and are often not water-resistant or corrosion-resistant.

Accordingly, a need exists for an improved jerk string system that floats, is water-resistant, corrosion-resistant, compact, easy-to-transport into the field, quick to set-up, and easy to deploy during conditions of darkness and/or inclement weather.

SUMMARY

An automatic wireless decoy jerk string system is disclosed. The wireless jerk string system includes: a main housing unit, a drive housing unit, and a flotation housing unit. The main housing unit contains a retractable reel wound with a line. The drive housing unit contains a direct current motor, a battery for powering the direct current motor, and a wireless receiver. The flotation housing unit contains a counterweight and flotation material. The drive housing and the flotation housing are attached to either side of the main housing unit. A drive shaft runs from the drive housing unit, through the main housing unit and into the flotation housing unit. The direct current motor engages the drive shaft to operate the reel. The direct current motor is controlled by signals from the wireless receiver in response to a wireless signals received by the wireless receiver from a wireless remote control to cause the reel to alternatingly retract the line and let out the line.

The decoy jerk string system disclosed herein can be operated wirelessly via a remote control device. The decoy jerk string includes an elastic portion made of a bungee cord or similar at one end, and a non-elastic portion for the remainder. The elastic portion of the jerk string is connected to an anchor point, and the non-elastic portion of the jerk string is used for connecting one or more decoys. To use the wireless decoy jerk string system disclosed herein, a hunter connects a jerk string to an anchor point. The anchor point may be a portable anchor point placed out in the water for the purpose of connecting the jerk string, or it may be an already existing structure. The hunter then attaches the line from the retractor of the wireless decoy jerk string system disclosed herein to the jerk string using a carabiner, clip, or another connection device. The hunter then walks to the blind or other anchor point while holding the retractor. As the hunter walks, the retractor allows the line to freely unwind off the reel within the retractor. When the hunter gets to the blind or other anchor point, the hunter attaches the retractor to the blind or anchor point using a clip or other connection means. The hunter controls the retractor using a wireless remote control, which can be used to cause the reel in the retractor to take up some of the jerk string and then release the jerk string to create motion of decoys attached to the jerk string. The retractor automatically winds and unwinds the jerk string at intervals that cause the jerk string to move at the desired speed and for the desired length of the pull. The automatic wireless jerk system disclosed herein is water-resistant, corrosion-resistant, and floats, in case it is dropped into the water by the hunter.

This summary is provided to introduce in a simplified form concepts that are further described in the following detailed descriptions. This summary is not intended to identify key features or essential features of the claimed subject matter, nor is it to be construed as limiting the scope of the claimed subject matter.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control. Embodiments of the presently disclosed subject matter provide for an automatic wireless decoy jerk string system.

Figure 1:
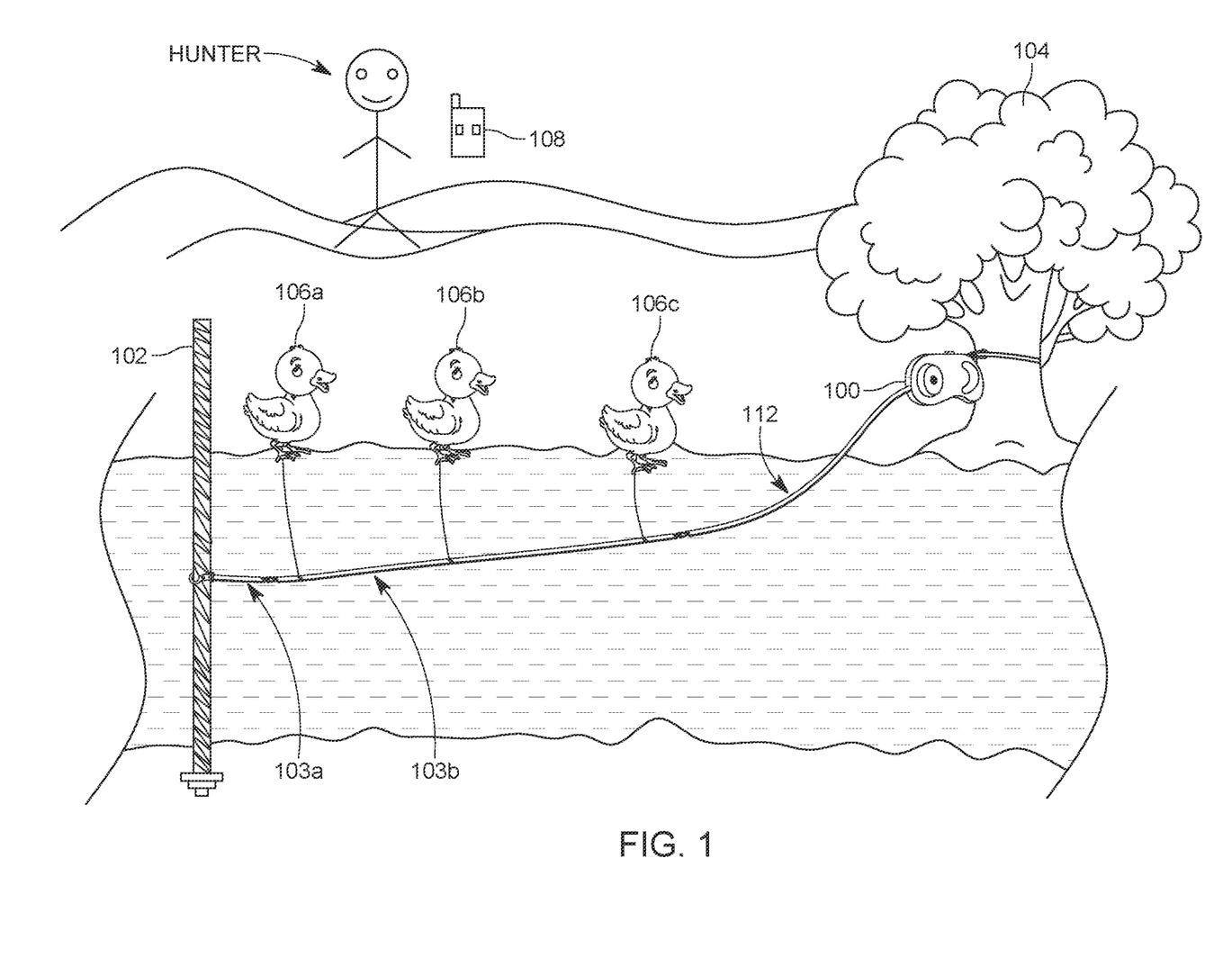
FIG. 1 depicts an exemplary layout of the automatic wireless decoy jerk system described herein.

FIG. 1 depicts an exemplary layout of the automatic wireless decoy jerk string system described herein. Referring to FIG. 1, the automatic wireless decoy jerk string system described herein comprises a retractor 100 and a corresponding wireless remote control 108. Wireless remote control 108 controls the operation of the retractor 100. Retractor 100 may be secured to a tree or other anchor point 104. Retractor 100 may be secured to anchor point 104 using any known way of securing, including, for example, a carabiner or other clip, a rope or other type of tie, an eye-bolt, or the like.

To provide a second anchor point for the jerk string, an anchor point 102 may be determined. Anchor point 102 may be a portable anchor point placed near the hunting blind, usually in the water. For example, anchor point 102 may include a ground-penetrating point, or other type of screw device, that allows anchor point 102 to be forcibly pushed or otherwise installed into the soft ground below the surface of the water. Alternatively, anchor point 102 may be a fixed feature at the hunting spot, such as a tree or other existing structure.

In addition to retractor 100 being secured at a first location 104, retractor 100 is further connected or secured to anchor point 102 via one or more segments of jerk string 103 and/or retractable line 112. For example, a length of line 112 may be unspooled from retractor 100 and attached to a jerk string. Line 112 may be detachably connected to the jerk string using any type of water-resistant and/or corrosion-resistant connection. An end of the jerk string opposite the connection to line 112 may then be connected to the anchor point 102.

In one embodiment, jerk string 103 may include both an elastic portion 103a and a non-elastic portion 103b. Elastic portion 103a is removably connected to anchor point 102. Line 112 is retracted from retractor 100 and removably connected to portion 103b of jerk string 103. The anchor point 102 may be placed as far from anchor 104 as the amount of line 112 in retractor 100 and/or the length of the jerk string allows. In an exemplary embodiment, the retractor 100 may include 50 yards of line, such that the anchor point 102 may be placed up to 50 yards away from anchor point 104 (or further if a jerk string is used).

In another embodiment, the line 112 in retractor 100 may be removably connected directly to anchor point 102 when anchor point 102 is installed in the ground, without the use of a separate jerk string. Line 112 may be attached to anchor point 102 using any type of connection, including for example, a carabiner or other type of clip or connection device.

One or more decoys 106a-106c may be attached to jerk string 103 or line 112 below the surface of the water, as shown in FIG. 1, such that movement of line 112 causes the decoys to move. For example, when line 112 is pulled in a direction toward retractor 102, the attached decoys are pulled toward the retractor 102 as well, causing the decoys to jerk or move on the water.

Once line 112 has been connected, either directly to anchor point 102 or to jerk string 103 that is itself attached to anchor point 102, the retractor 100 is then walked by the hunter to another anchor point to be mounted. The shape of the retractor 100 includes an integrated handle such that it may be easily held in one hand by the hunter or may be easily clipped to the hunter's clothes (e.g., belt or waders) while they walk back to their hunting blind or other fixed anchor point.

The operation of retractor 100 may be controlled by wireless remote 108. Wireless remote 108 may communicate with retractor 100 via one or more wireless network protocols. These may include, but are not limited to, Bluetooth, WiFi, cellular, NFC, radio frequency (RF), and infrared (IR). Wireless remote 208 may include a battery, memory, processor, and a wireless communications interface. Batteries in wireless remote 208 may be removeable (e.g., replaceable batteries) or integrated (e.g., rechargeable battery pack).

The wireless remote 108 may be operated by the hunter. The hunter may be located within a communications range of retractor 100 to control retractor 100 via wireless remote 108. This advantageously allows the hunter to be located away from retractor 100 during operation of retractor 100.

The wireless remote 108 includes one or more operational buttons that communicate with a wireless receiver in retractor 100. The hunter uses the wireless remote 108 to cause the retractor 100 to retract and/or let out a portion of line 112, which causes the decoys 106a-106c to move as the line moves. The anchor point 102 creates a point against which that retractor 100 pulls the line 112 and/or jerk string 103, which causes the decoys to rebound as line 112 is pulled toward the retractor 100 to create tension and then they rebound away from the retractor 100 when it releases the created tension. In embodiments where a jerk string 103 is used and has an elastic end closest to the anchor point 102, the elastic end allows for further movement of the decoys.

Figure 2:
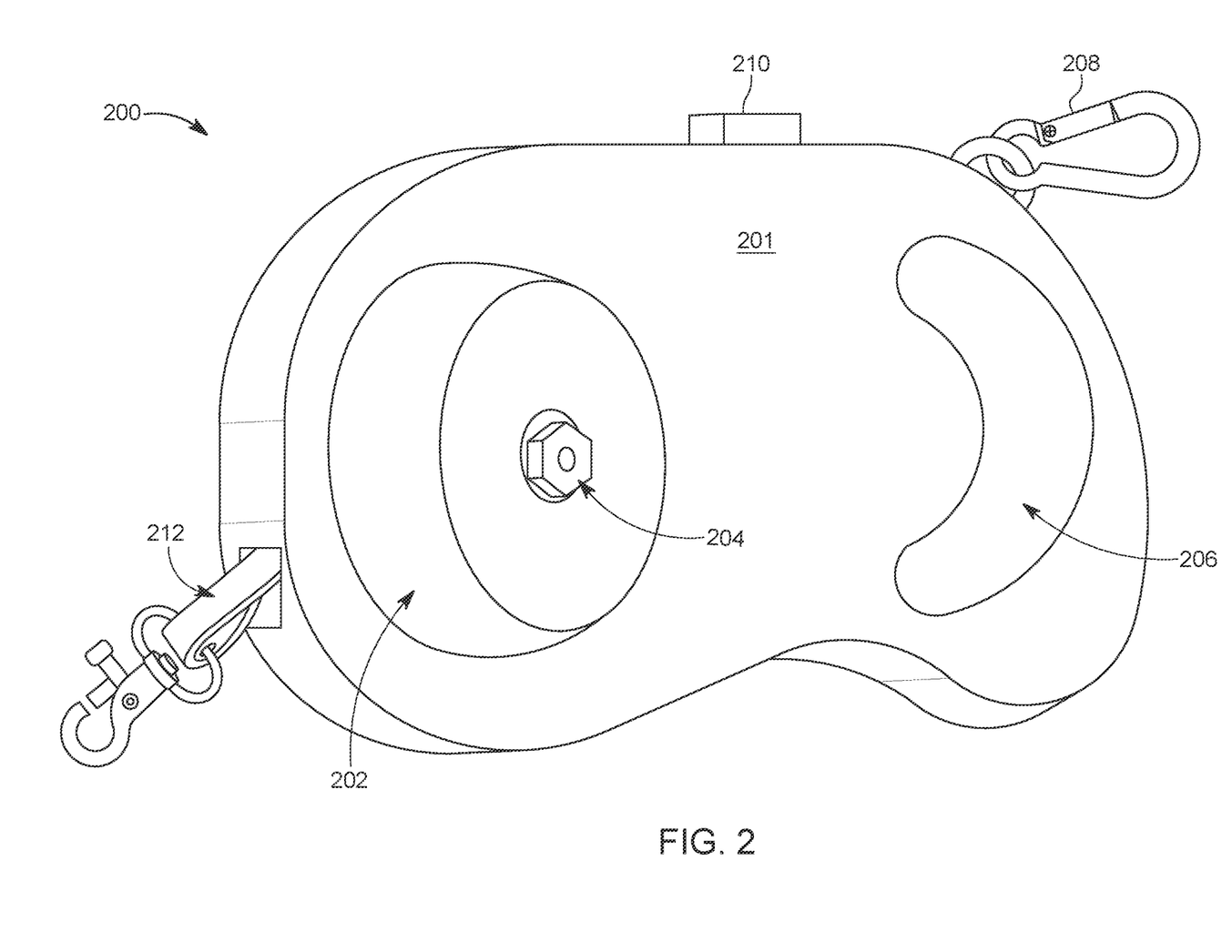
FIG. 2 depicts a side view of an exemplary embodiment of the retractor of the automatic wireless decoy jerk system.
Figure 3:
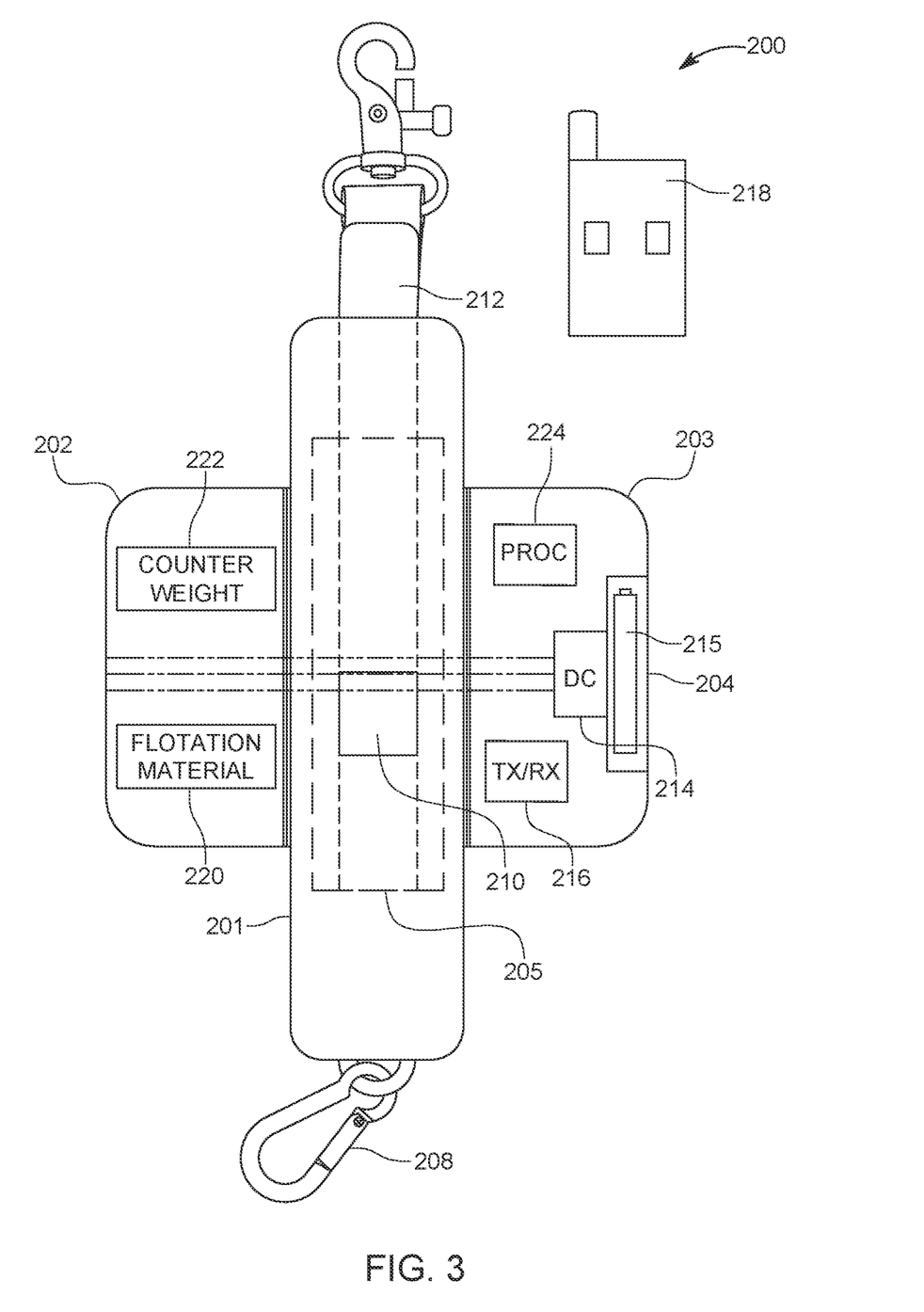
FIG. 3 depicts a top view of an exemplary embodiment of the retractor of the automatic wireless decoy jerk system.

FIG. 2 depicts a side view of retractor 100, and FIG. 3 depicts a top view of internal functional components of retractor 100 according to an exemplary embodiment of the automatic wireless decoy jerk string system disclosed herein. Referring to FIGS. 2 and 3, the retractor 200 comprises a main housing 201, a flotation housing 202 and a drive housing 203 (not shown in FIG. 2 because of the side-view angle). Although the flotation housing 202 and drive housing 203 are shown on particular sides of main housing 201, a person skilled in the art will understand that the housings may be arranged differently without departing from the spirit of the disclosure.

Main housing 201 is a housing having an integrated handle 206. Integrated handle 206 makes for easy one-handed grip of the retractor 200 while the hunter is walking from where the decoys are set up to where the retractor 200 will be anchored. Main housing 201 may be made of plastic, fiberglass, or another polymer such that it is corrosion resistant. Main housing 201 houses a self-contained retractable reel 205. The retractable reel 205 includes line 212, which may be flat webbing or a synthetic line. In one embodiment, the retractable reel 205 may be spring-loaded such that when button 210 is depressed, line 212 quickly retracts into retractor 200.

A hex drive shaft 204 runs perpendicularly through main housing 202 and the retractable reel 205 within it. The hex drive shaft 204 engages and acts as a spindle for the retractable reel system. When hex drive shaft 204 rotates, it causes retractable reel 205 to turn. The turning of reel 205 causes line 212 to either be let out of main housing 201 or be retracted into main housing 201.

The drive housing 203 is a housing that houses motor 214, batteries 215, and remote control receiver 216. In one embodiment, motor 214 may be an adjustable variable-speed auto-reversing reciprocal direct drive DC motor. In another embodiment, motor 214 may be a bi-directional direct current motor. In one embodiment, motor 214 is positioned in line with hex drive shaft 204 and drives hex drive shaft 204 directly (as shown in FIG. 2). In other embodiments, motor 214 may not be directly in line with hex drive shaft 204. In these embodiments, one or more drive gears may be used to transmit power from motor 214 to hex drive shaft 204. The drive gears may be any types of gears, such as bevel gears, for example, which allow motor 214 to be positioned approximately perpendicular to hex drive shaft 204 within drive housing 203. Motor 214 may be configured such that it allows hex drive shaft 204 to freely spool in either direction when the motor 214 does not have power being applied to it. Such a configuration is beneficial in that it allows the hunter to easily feed line 212 out of the reel 205 while walking with the retractor 200, as well as retract the line 212 quickly by depressing button 210 and allowing the spring-loaded nature of the retractor to retrieve line 212 quickly.

Batteries 215 provide power to motor 214 and remote control receiver 216. Batteries 215 may be held in place by a battery holder. Batteries 215 may be standard non-rechargeable AA or 9V batteries of sufficient size and number to drive the motor for a period of at least four hours of continuous operation. Motor 214 is connected to the other electronics in drive housing 203 via related wiring (not shown, for simplicity). Remote control receiver 216 receives wireless signals from the remote control 218 and uses those wireless signals to control the motor 214.

The use of disposable batteries is one of the many improvements over existing jerk string systems because disposable batteries require no external charging ports which can introduce water intrusion and the accompanying corrosion, because there is no recharging time period, and because they can be easily replaced in the field when they run out.

A remote control receiver 216 is housed in the drive housing 203. Remote control receiver 216 controls the power to the motor 214 by remote transmitter 108. The ability to control the jerk string system remotely using a remote control 218 is another of the many improvement over existing jerk string systems because it allows the hunter needs to operate the retractor remotely when the hunter is not collocated with the retractor. The remote transmitter 218 and remote control receiver 216 may be any commercially known wireless remote control system.

The remote control system may provide various types of functionality to the retractor 200 consistent with this disclosure. For example, the remote control system may allow the hunter to manually retract/extend the line using different buttons. The remote control system may allow the hunter to set one or more custom intervals for the retractor to automatically retract/extend the line. In some embodiments, the retractor may further include a processor 224 in drive housing 203 that is communicatively coupled to the remote control receiver 216 to control the motor 214 in response to the received signals from the remote control.

Drive housing 203 may be made of plastic, fiberglass, or another polymer such that it is corrosion resistant. In some embodiments, drive housing 203 may further include flotation material 220 to provide flotation to the retractor 200 in case it is dropped in the water. Drive housing 203 may be waterproof and/or watertight to prevent water from getting in the housing and damaging the electronics.

Flotation housing 202 is a housing that is identical or nearly identical in size and shape to drive housing 203. Having the same size and shape for both drive housing 203 and flotation housing 202 provides symmetry for the retractor 100.

Flotation housing 202 houses counterweight 222 and flotation material 220. The counterweight 222 is selected such that flotation housing 202 weighs approximately the same as drive housing 203 so that retractor 100 is approximately balanced. Being approximately balanced is beneficial in that it helps the retractor 100 hang approximately evenly when hanging from carabiner 208. Flotation material 220 provides flotation to the retractor 200 in case it is dropped in the water. Flotation housing 203 may be made of plastic, fiberglass, or another polymer such that it is corrosion resistant. Flotation housing 203 may be waterproof and/or watertight to prevent water from getting in the housing.

Flotation housing 202 receives the hex drive shaft 204 and seats the hex drive shaft 204 into a spinning receiving device, thereby anchoring the end of the hex drive shaft 204 coming from the drive housing 203. Counterweight 222 balances the weight of the drive housing 203 and counterbalances the torque of the motor 214 housed in the drive housing 203. When the motor 214 turns in either direction, it creates torque that cause the retractor 100 to rotate. Counterweight 222 minimizes the effect of such torque.

Main housing 201 includes a forward aperture though which line 212 passes. Main housing 201 further includes, opposite the forward aperture, a rear anchor point, such as a hole in main housing 201 or a protrusion from main housing 201. The anchor point may be attached to a carabiner 208 or other connection device, such as, for example, a ring, a d-ring, a hook, a clip, a snap-swivel, or the like. Carabiner or other connection device 208 allows the hunter to attach the retractor 200 to a fixed object, such as a duck blind, a tree, a stump, a post, a stake, or the like (shown as tree 104 in FIG. 1). The attachment may be by any known connection device, or any combination of the following standard means and methods of attaching one object to another, such as, but not limited to an eye-bolt, a hook-and-loop fastener, a line of any material such as rope, cord, chain, bungee cord, or anything of a similar nature allowing for the hunter to attach the retractor 200 to a fixed object. Additionally, carabiner 208 or other connection device further allows the hunter to connect the retractor 200 to their clothes to free up their hands while they walk back from where the decoys are set up to where the retractor 200 is anchored.

Retractable reel 205 holds line 212, which is wound about retractable reel 205. Line 212 may be a synthetic material, either a round in circumference shape like a line, or flat like a tape/ribbon shape, or a coated wire cable, or any other material that is non-rotting, non-mildewing, non-binding, of sufficient and appropriate tensile strength. In one embodiment, line 212 is no more than 50 yards in length. In other embodiments, it may be longer or shorter, depending on the needs of the specific hunting location. Retractable reel 205 allows the retractor 200 to pay-out and retract line 212 anywhere from zero to 50 yards.

Line 212 further includes a connecting device, such as a d-ring or carabiner, at the proximal end of the line. The connecting device may be a hook, a clip, a snap-swivel, a carabiner, or the like, that attaches to a remote anchor point, such as, for example, anchor 102 shown in FIG. 1.

The flotation housing 202 and drive housing 203 each attach to the main housing 201 using a watertight, waterproof means of attachment, such as, for example, a threaded engagement with a gasket seal (as shown in FIG. 2), a snap-in latch with a gasket seal, or the like.

The motor 214 is mounted in the drive housing 203, and the hex drive shaft 204 runs through the main housing 201. Hex drive shaft 204 runs from the drive housing 203 through an aperture in main housing 201 and through the watertight, waterproof spindle running through the center of the retractable reel 205 housed in the main housing 201. The hex drive shaft 204 continues through an aperture in the opposite side of the main housing 201, and into the flotation housing 202, where it is seated in a spinning receiver to anchor the end of the hex drive shaft 204.

The use of direct drive motor 214 is nearly silent, which is important in waterfowl hunting, and it has fewer moving parts that other larger, well-known motors, making it more reliable. It is appreciated, however, that other types of motor 214 may be used without departing from the scope of the subject matter described herein.

In one embodiment, the automatic wireless decoy jerk string system described herein may be programmable. In contrast to embodiments discussed above where operation of the retractor 100 is controlled by the hunter via wireless remote 108, in other embodiments the hunter may preprogram the operation of retractor 100. For example, retractor 100 may either spool (retract) or unspool (let out) line 112 by turning hex drive shaft 204 in either a forward or a reverse direction.

In one embodiment, the speed with which line 112 is spooled or unspooled may be fixed. For example, one foot per second symmetrically (i.e., the same speed in forward and reverse). In another embodiment, the speed with which line 112 is spooled or unspooled may be different (i.e., asymmetric). For example, line 112 may be unspooled at a rate of two feet per second but spooled at a rate of one foot per second. In another embodiment, the speed with which line 112 is spooled and unspooled may be variable. In one embodiment, this may include selecting from multiple different spooling or unspooling rates. In another embodiment, this may include increasing or decreasing the spooling or unspooling rate over time. For example, it may be desirable to spool line 112 initially at a first rate (e.g., slow—one foot per second) for a first period of time (e.g., two seconds) and then spool line 112 at a second rate that is different from the first rate (e.g., fast—two feet per second) for a second period of time (e.g., eight seconds). Thus, when line 112 is spooled for a total period of time encompassing the first and second periods (e.g., ten seconds) the amount of line 112 retracted may be between the first and second spool rates. Additionally, by varying the spooling or unspooling rate over time, movement of the decoys 106 may be more realistic.

In another embodiment, the rate and amount of time that line 112 is spooled or unspooled is pre-programmed and stored in a memory of retractor 100. In this embodiment, the hunter selects a program to be executed and initiates or terminates the program via wireless remote 108, which contrasts with embodiments described above where the hunter directly controls operation of retractor 100 via remote 108. For example, retractor 100 may store a first program that, when executed, causes retractor 100 to spool line 112 at a first rate for a period of time corresponding to a desired length of line 112 and to unspool line 112 at a second rate for a period of time corresponding to the same length of line 112 (e.g., jerk two feet of line quickly over one second and then let out the two feet of line slowly over five seconds). Retractor 100 may also store a second program that, when executed, causes retractor 100 to spool line 112 at a first rate for a first period of time, pause, spool line 112 at the first rate again for the second period of time, then unspool line 112, and repeat the sequence (e.g., pull one feet of line for one second, pause for four seconds, pull another foot of line for one second, let out two feet of line, and repeat).

It is appreciated that any number of programs may be stored or executed by retractor 100 (for example, by processor 224 of retractor 100), where each program may include various combinations of spooling rates, unspooling rates, and associated periods of time. It is further appreciated that each program may advantageously mimic the movement of different waterfowl. In this way, a hunter hunting a first species of duck may select a first program to execute while a hunter hunting a second species of duck may select a second program to be execute. This allows multiple hunters to utilize the same automatic wireless decoy jerk string system described herein because it is programmable. Likewise, the same hunter can utilize multiple programs for hunting different species, location, times of year, etc.

It is also appreciated that pre-programming retractor 100 allows the hunter to initiate operation (i.e., execute a selected program stored on retractor 100) and move to a location that is outside of the communications range of retractor 100. In contrast to some embodiments described above where the hunter must stay within the communications range of retractor 100 in order to transmit a signal to retractor 100 for spooling or unspooling line 112, embodiments where retractor 100 is configured to execute a program stored in memory on retractor 100 allows retractor 100 to continue to operate (i.e., spool and unspool line 112) autonomously and automatically without continuous, direct control via remote 108. This allows the hunter to temporarily move outside of the communications range of retractor 100 without interrupting its operation.

It is appreciated that programs that may be stored and executed by retractor 100 may be shareable. For example, one or more programs may be embodied as a text file containing lines of computer-readable instructions. These instructions may be editable by the hunter and may be transmitted electronically via any suitable communications means. This can include a USB drive, a direct connection via a USB cable, or a network such as the Internet.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium(s) may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A wireless jerk string system, comprising:
    a main housing unit containing a retractable reel wound with a line;
    a drive housing unit containing a direct current motor, a battery for powering the direct current motor, and a wireless receiver; and
    a flotation housing unit containing a counterweight and flotation material;
    wherein the drive housing and the flotation housing are attached to either side of the main housing unit;
    wherein a drive shaft runs from the drive housing unit, through the main housing unit and into the flotation housing unit;
    wherein the direct current motor engages the drive shaft to operate the reel; and
    wherein the direct current motor is controlled by signals from the wireless receiver in response to a wireless signal received by the wireless receiver from a wireless remote control to cause the reel to alternatingly retract the line and let out the line.

2. The wireless jerk string system of claim 1, wherein the battery for powering the direct current motor is a non-rechargeable AA or 9-volt battery.

3. The wireless jerk string system of claim 1, wherein the drive housing unit and the flotation housing unit are watertight.

4. The wireless jerk string system of claim 1, wherein the main unit, the drive housing unit, and the flotation housing unit are made of a corrosion resistant material.

5. The wireless jerk string system of claim 1, wherein the drive shaft is a hex shaped drive shaft.

6. The wireless jerk string system of claim 1, wherein the drive housing unit further includes a bevel gear that couples the direct drive motor to the drive shaft.

7. The wireless jerk string system of claim 1, wherein the direct current motor is a reversible motor.

8. The wireless jerk string system of claim 1, further comprising a wireless remote that communicates with the wireless receiver.

9. The wireless jerk string system of claim 1, further comprising a portable anchor point.

10. The wireless jerk string system of claim 1, wherein the line includes a connection device at its proximal end.

11. The wireless jerk string system of claim 1, wherein the main housing unit includes a connection device mounted at its rear end.

12. The wireless jerk string system of claim 1, wherein the main housing unit includes an integrated handle.

13. The wireless jerk string system of claim 1, further comprising a jerk string for connecting between the line and an anchor point.

14. The wireless jerk string system of claim 1, wherein the retractable reel is spring-loaded.

15. The wireless jerk string system of claim 1, further comprising the wireless remote control configured to wirelessly control the wireless jerk string system.

16. The wireless jerk string system of claim 1, further comprising a non-transitory computer readable storage medium having computer readable program code embodied therewith, the computer readable program code configured to control the direct current motor causing the reel to retract the line and let out the line according to a predetermined sequence, wherein the predetermined sequence defines at least one of:
    a period of time for which the line is retracted;
    a rate at which the line is retracted;
    a period of time for which the line is let out;
    a rate at which the line is let out;
    an indication as to whether to repeat the predetermined sequence;
    a time period during which the predetermined sequence is to be executed; and
    a number of times the predetermined sequence is to be executed.

* * * * *